United States Patent
Lamba et al.

(10) Patent No.: US 10,901,849 B2
(45) Date of Patent: *Jan. 26, 2021

(54) DYNAMIC AUTHORIZATION BATCHING IN A DISPERSED STORAGE NETWORK

(71) Applicant: International Business Machines Corporation, Armonk, NY (US)

(72) Inventors: Amit H. Lamba, Buffalo Grove, IL (US); Brian F. Ober, Lake in the Hills, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/514,420

(22) Filed: Jul. 17, 2019

(65) Prior Publication Data

US 2019/0340073 A1    Nov. 7, 2019

Related U.S. Application Data

(63) Continuation of application No. 15/907,785, filed on Feb. 28, 2018, now Pat. No. 10,592,340.

(51) Int. Cl.
*G06F 11/10* (2006.01)
*H04L 29/06* (2006.01)
(Continued)

(52) U.S. Cl.
CPC ........ *G06F 11/1092* (2013.01); *G06F 3/0619* (2013.01); *G06F 11/1076* (2013.01);
(Continued)

(58) Field of Classification Search
CPC ....... H04L 63/08; H04L 63/10; H04L 63/102; G06F 11/1076; G06F 3/069; G06F 11/1092
See application file for complete search history.

(56) References Cited

U.S. PATENT DOCUMENTS

| 9,323,603 B2 | 4/2016 | Resch et al. |
| 9,369,526 B2 | 6/2016 | Resch et al. |

(Continued)

FOREIGN PATENT DOCUMENTS

| CN | 103491075 A | 1/2014 |
| CN | 106233259 A | 12/2016 |

OTHER PUBLICATIONS

International Searching Authority; International Search Report and Written Opinion; International Application No. PCT/IB2019/050992; dated May 29, 2019; 9 pgs.

(Continued)

*Primary Examiner* — Shelly A Chase
(74) *Attorney, Agent, or Firm* — James Nock; Andrew D. Wright; Roberts Calderon Safran & Cole, P.C.

(57) ABSTRACT

A method for execution by a dispersed storage and task (DST) processing unit includes queuing authorization requests, corresponding to received operation requests, in response to determining that first system utilization data indicates a first utilization level that compares unfavorably to a normal utilization threshold. A first batched authorization request that includes the queued authorization requests is generated for transmission to an Identity and Access Management (IAM) system in response to determining that the first request queue compares unfavorably to a first queue limit condition. A second queue limit condition that is different from the first queue limit condition is determined based on second system utilization data. A second batched authorization request that includes a second plurality of authorization requests of a second request queue is generated in response to determining that the second request queue compares unfavorably to the second queue limit condition.

20 Claims, 10 Drawing Sheets

(51) Int. Cl.
  *H04L 29/08*  (2006.01)
  *G06F 3/06*  (2006.01)
  *H03M 13/15*  (2006.01)

(52) U.S. Cl.
  CPC ............ *H04L 63/08* (2013.01); *H04L 63/102* (2013.01); *H04L 67/1097* (2013.01); *H03M 13/1515* (2013.01)

(56) References Cited

U.S. PATENT DOCUMENTS

| | | |
|---|---|---|
| 9,430,286 B2 | 8/2016 | Volvovski et al. |
| 9,443,099 B2 | 9/2016 | Grube et al. |
| 9,798,621 B2 | 10/2017 | Resch et al. |
| 2012/0265937 A1 | 10/2012 | Resch et al. |
| 2015/0222604 A1* | 8/2015 | Ylonen .................. H04L 63/10 713/171 |
| 2015/0234708 A1 | 8/2015 | Storm et al. |
| 2016/0191242 A1 | 6/2016 | Resch et al. |
| 2016/0342475 A1 | 11/2016 | Dhuse et al. |
| 2017/0060459 A1 | 3/2017 | Kaczmarek et al. |
| 2017/0123947 A1 | 5/2017 | Baptist et al. |
| 2017/0315735 A1 | 11/2017 | Leggette et al. |
| 2017/0329957 A1* | 11/2017 | Vepa ....................... G06F 21/34 |
| 2017/0331813 A1* | 11/2017 | Lander ................ H04L 63/0815 |
| 2019/0266052 A1 | 8/2019 | Lamba et al. |

OTHER PUBLICATIONS

Notice of Allowance in related U.S. Appl. No. 15/907,785 dated Nov. 6, 2019, 5 pages.

List of IBM Patents or Patent Applications Treated as Related, Jan. 6, 2020, 1 page.

\* cited by examiner distributed, or dispersed, storage network (DSN) 10

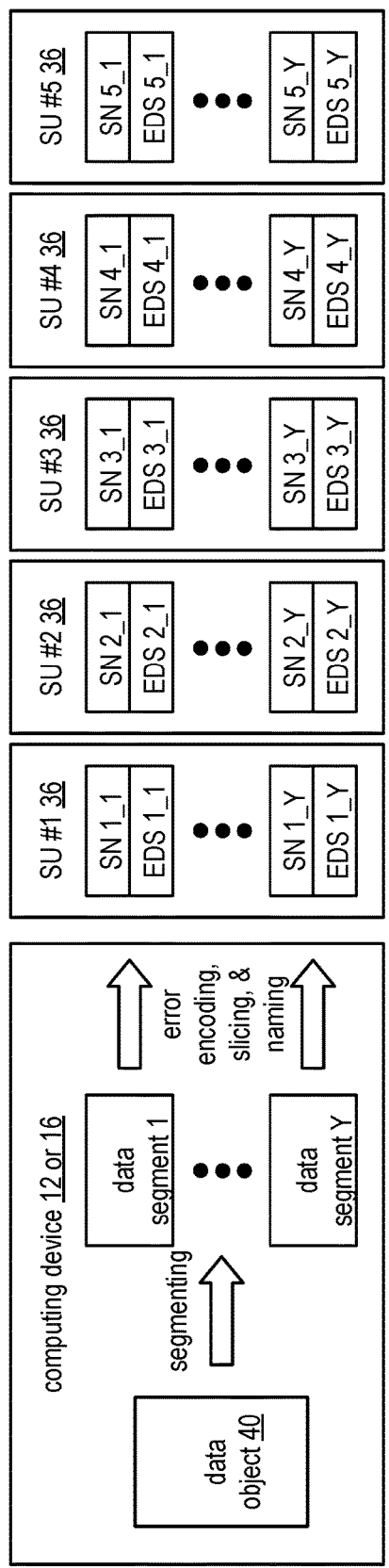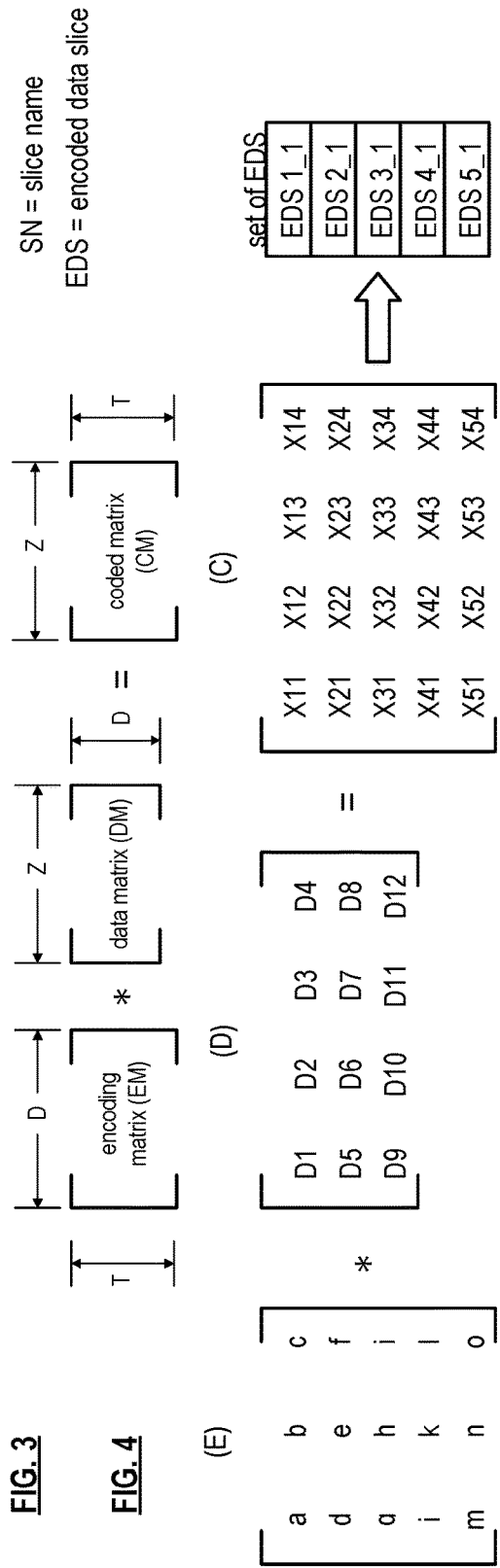

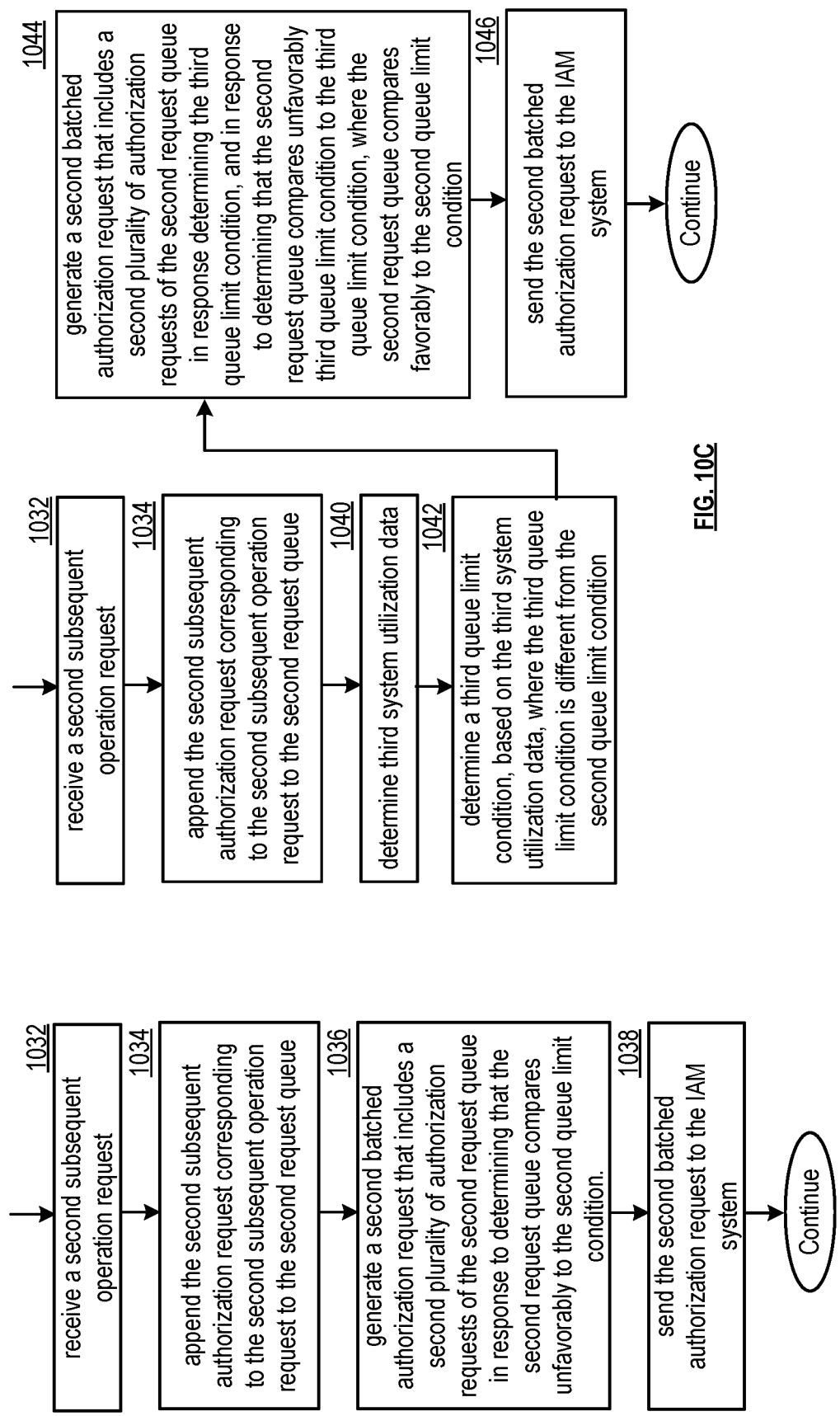

DYNAMIC AUTHORIZATION BATCHING IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Application US20170060459A1 to Applicant discloses a method for execution by a DST execution unit that includes receiving an access request that includes an authorization token from a computing device via a network, generating authorization data based on the access request, Executing the access requests, and transmitting a result of the access request to the computing device via the network when the authorization data includes a verification indicator. An invalid token notification is generated for transmission to the computing device when the authorization data includes an invalid token indicator.

Application US20170315735A1 to Applicant discloses selection of a first proper subset of dispersed storage and task (DST) execution units of a dispersed storage network (DSN) by a processing system. The processing system batches access requests over a time period in accordance with the first proper subset of the DST execution units of the DSN to limit the access requests to the first proper subset of DST execution units of the DSN during the time period.

U.S. Grant US9798621B2 to Applicant discloses a managing unit connected to a network that broadcasts and updates secure access control list information across the network. Upon a target device receiving the broadcast, the target device creates and sends an access control list change notification message to all other system devices that should have received the same broadcast if the broadcast is a valid request to update access control list information. The target device waits for responses from the other system devices to validate that the broadcast has been properly sent to a threshold number of other system devices before taking action to operationally change local data in accordance with the broadcast.

The limitations and disadvantages of conventional and traditional approaches will become apparent to one of ordinary skill in the art through comparison of such systems with the present disclosure.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10B is a logic diagram of an example of a method of dynamic authorization batching in accordance with the present invention; and FIG. 10C is a logic diagram of an example of a method of dynamic authorization batching in accordance with the present invention.

DETAILED DESCRIPTION OF THE INVENTION

Figure 1:
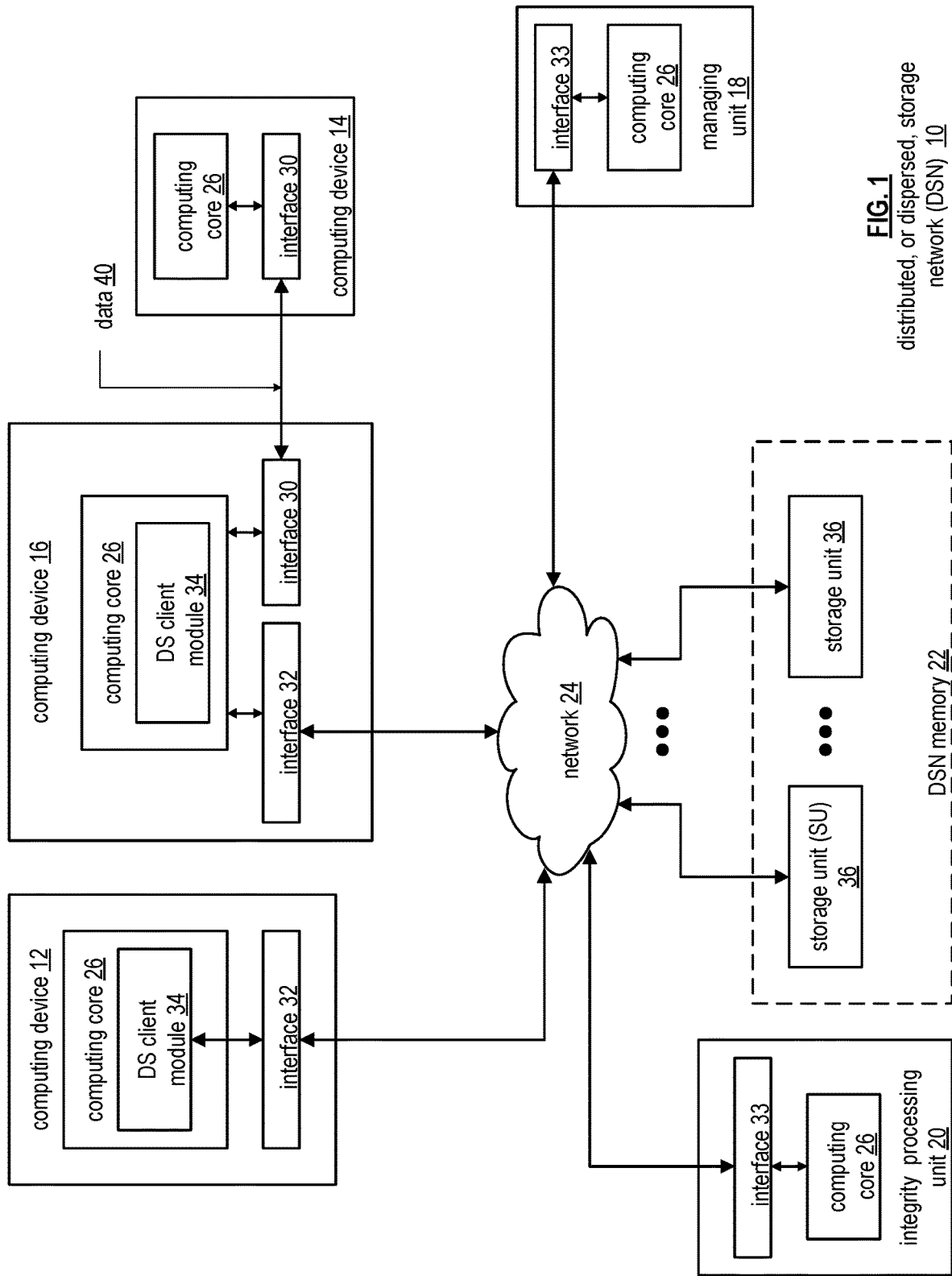
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
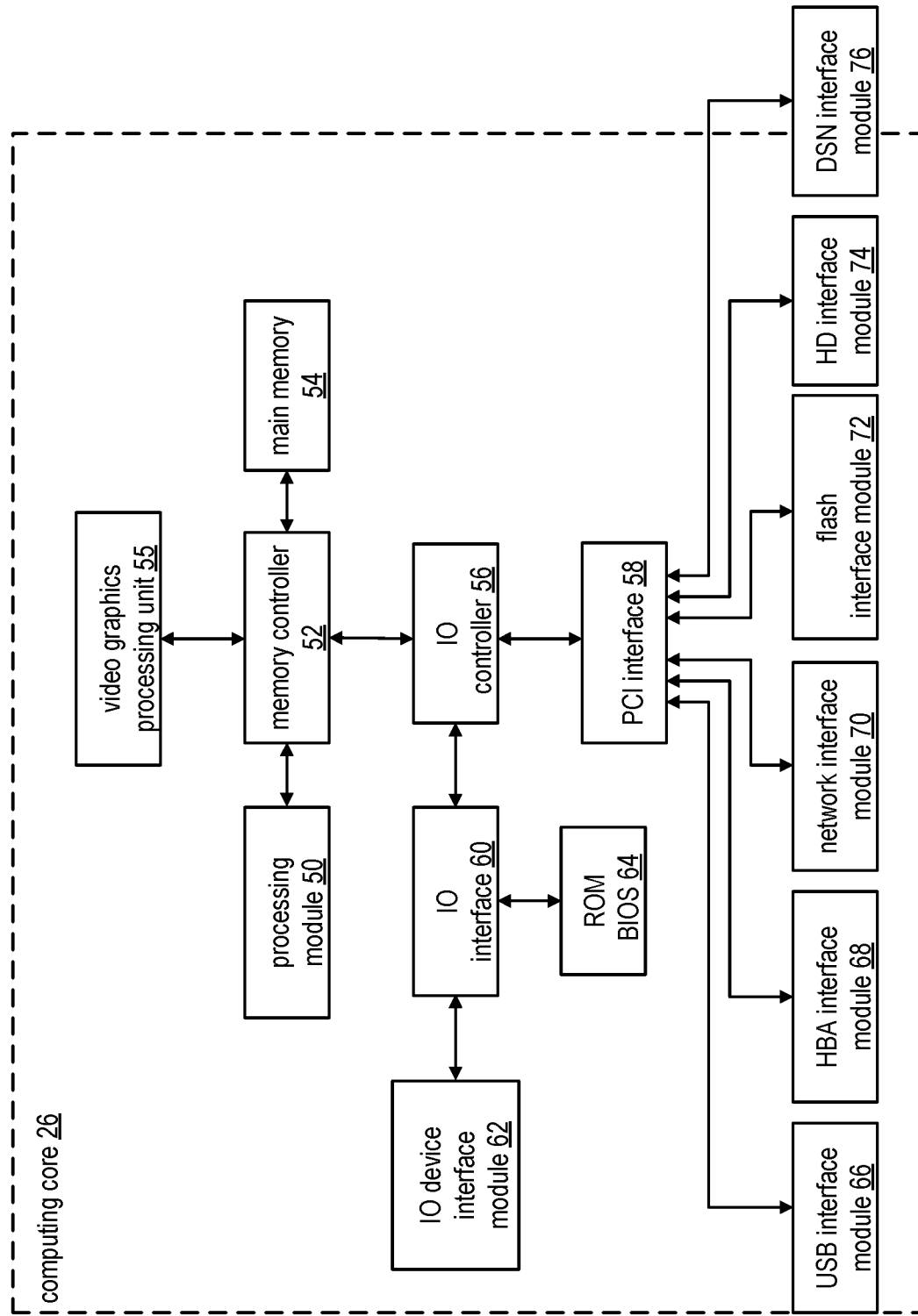
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
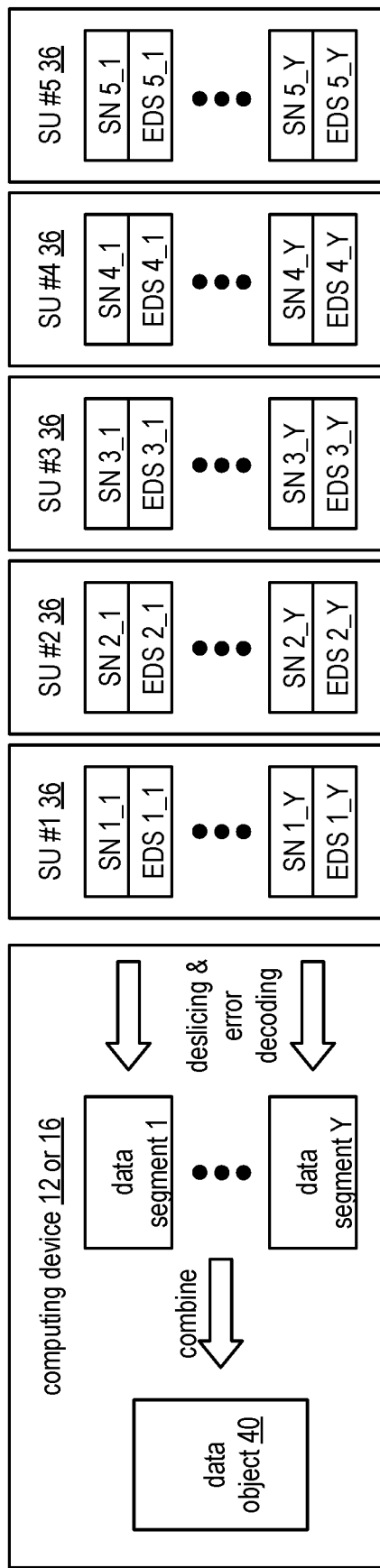
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
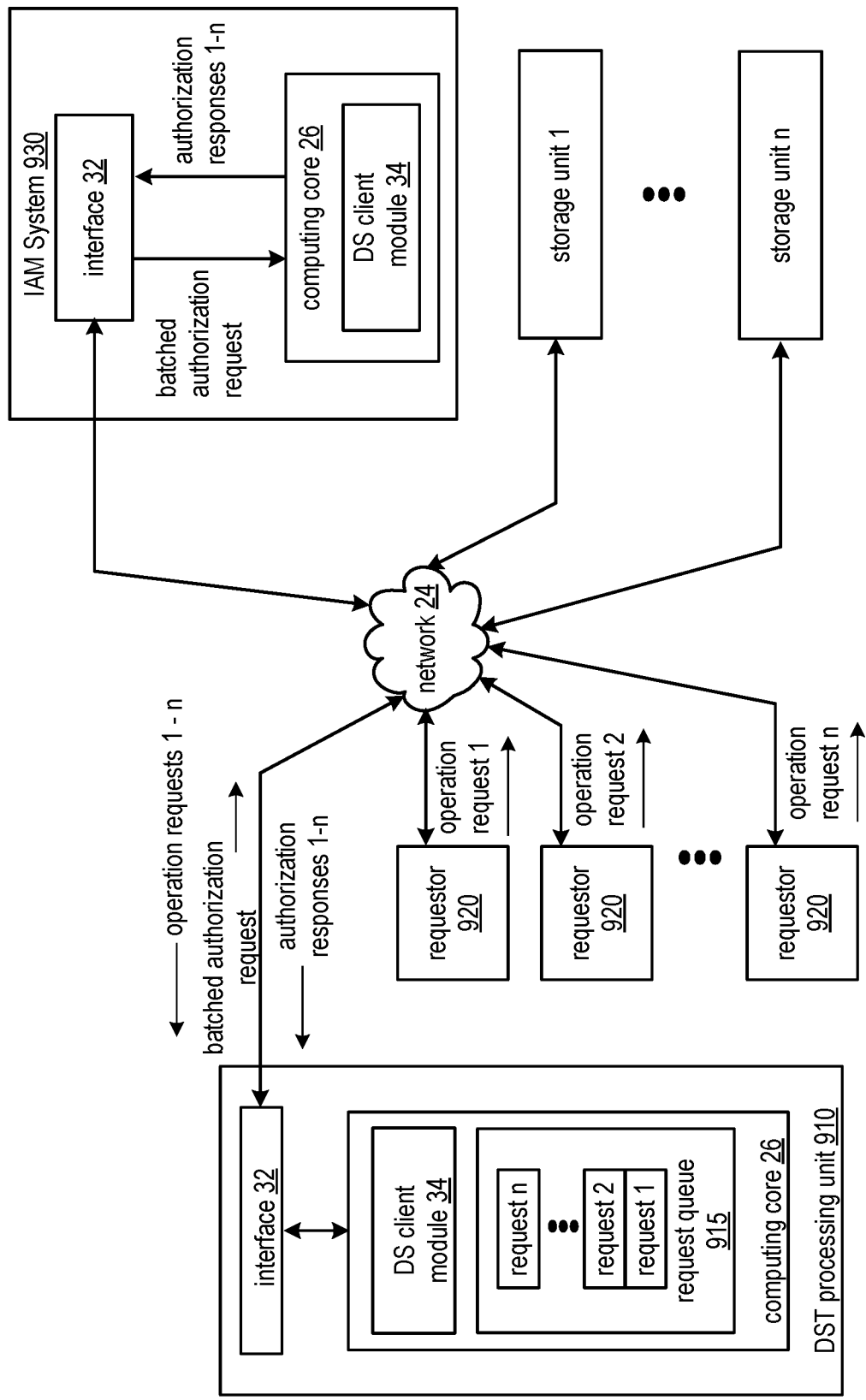
FIG. 9A is a schematic block diagram of an embodiment of a dispersed or distributed storage network (DSN) in accordance with the present invention.

FIG. 9A is a schematic block diagram of another embodiment of a dispersed storage network (DSN) that includes a DST processing unit 910, a plurality of requestors 920, a plurality of storage units 1-n, an Identity and Access Management (IAM) system 930, and the network 24 of FIG. 1. The DST processing unit 910, some or all of the requestors 920, some or all of the storage units 1-n, and the IAM system 930 can include the interface 32 of FIG. 1, the computing core 26 of FIG. 1, and/or the DS client module 34 of FIG. 1. The DST processing unit 910 of the DSN functions to relieve network congestion and system utilization by batching authentication and/or authentication requests transmitted to the IAM system 930, and/or can dynamically adjust that behavior to optimize the tradeoff between utilization and latency.

Each storage unit can be implemented utilizing the storage unit 36 of the DSN memory 22 of FIG. 1. The DST processing unit 910 can be implemented by utilizing computing device 16, for example functioning a dispersed storage processing agent for computing device 14 as described previously, and/or can be implemented by utilizing one or more storage units 36, for example, functioning as a dispersed storage and task unit. The DST processing unit can be also implemented by utilizing any system that includes a processor and memory, operable to facilitate execution of access requests and other operation requests to some or all storage units 36 of DSN memory 22, operable to monitor utilization of DSN memory 22, and/or operable to monitor congestion and/or network utilization of network 24. Some or all of the requestors 920 can be implemented by utilizing computing device 12, 14, or 16, can correspond to a user device, and/or can be implemented by utilizing any system that includes a processor and memory, responsible for sending operation requests to the DST processing unit via network 24. The IAM system 930 can be implemented by utilizing computing device 16, the managing unit 18 of FIG. 1, the integrity processing unit 20, or any system communicating with network 24 that includes a processor and memory and is operable to authenticate and/or authorize operation requests to the DST processing unit 910.

When a requestor 920 initiates an operation into DSN memory, that requestor must be authorized to ensure that they are permitted to perform such an operation. The IAM system 930 is operable to perform such an authorization. In normal utilization conditions, this authorization can be performed in-line with each operation. In other words, when an operation is performed, the authorization occurs immediately.

However, circumstances may arise where reducing the traffic to the IAM system is advantageous or required to avoid impacting availability and/or reliability. One example is when the IAM system is in an overloaded condition and reducing the traffic would help reduce its utilization. Another example is when the network experiences abnormal congestion, and where reducing the overall network traffic would help alleviate such congestion. Applying Dynamic Authorization Batching, as described herein, can automatically tune itself to reduce the traffic to an IAM system in such conditions.

Applying Dynamic Authorization Batching can include at least one of the following main aspects: (1) the process by which the DST processing unit 910, and/or another element of the DSN memory 22, gains an understanding of the current capacity and utilization of the system; (2) the application of that understanding for optimizing flow control of future authorization requests; and (3) the monitoring of such optimizations to quantifiably measure its benefit.

As a part of understanding the current system capacity and utilization, DST processing unit 910 can first become aware of the different system components that participate in the authorization process and their potential capacity, such as network switches or other routing components of network 24, the IAM system 930, storage units 1-n, and/or other components of the DSN. Such information could be obtained via configured and/or dynamic component and network topology discovery.

Next, the DSN memory can dynamically become aware of the current utilization of each system component and how it impacts their total capabilities. For example, the DST processing unit 910 can dynamically learn about the capacity and utilization percentage of an IAM system 930 via periodic capacity advertisements. Alternatively or in addition, the DST processing unit 910 can periodically query the congestion and utilization of some or all network switches and/or other various network elements of network 24 that are traversed during the authorization process.

Figure 9B:
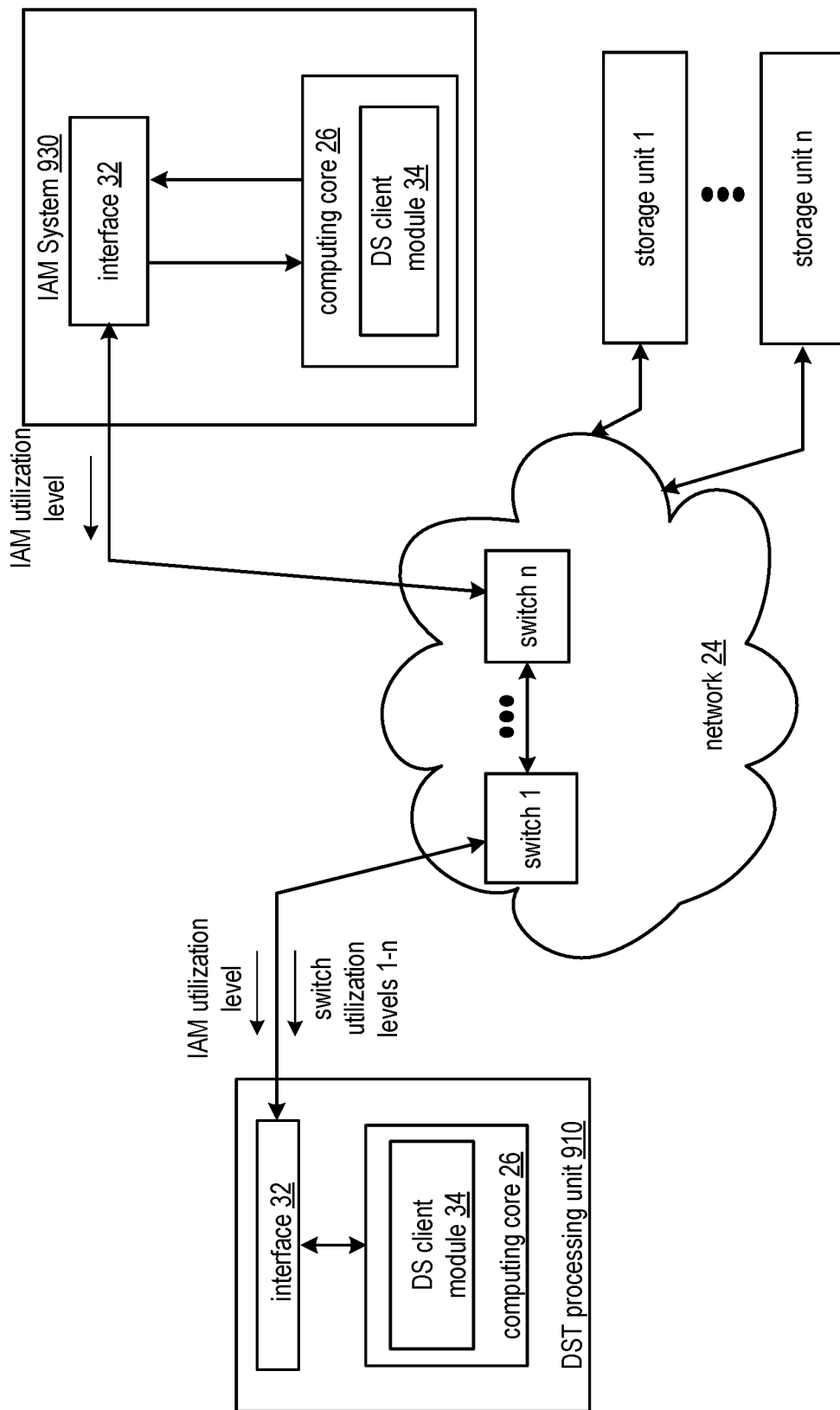
FIG. 9B is a schematic block diagram of an embodiment of a dispersed or distributed storage network (DSN) in accordance with the present invention.
Figure 9C:
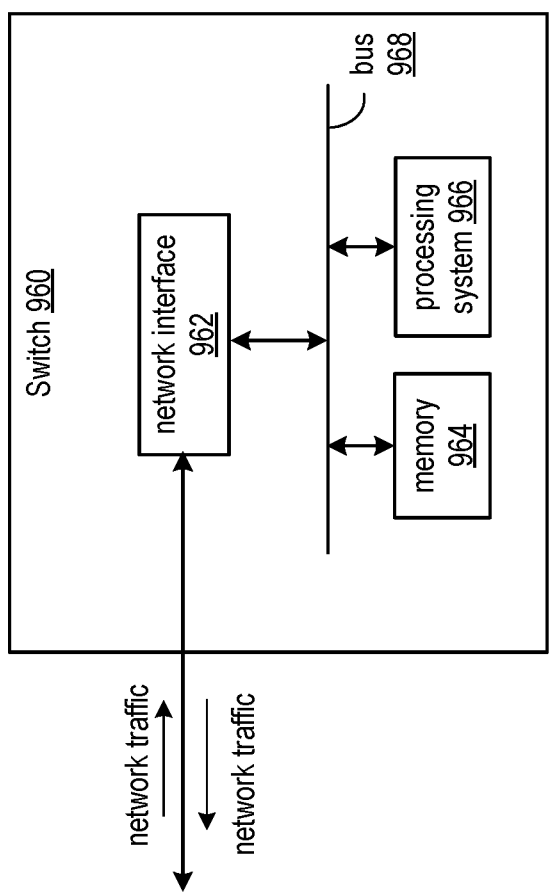
FIG. 9C is a schematic block diagram of an embodiment of a network switch in accordance with the present invention.

For example, as shown in FIG. 9B, authorization requests from the DST processing unit 910 to the IAM system 930 can be routed via a plurality of network switches 1-n of the network 24. Some or all network switches 1-n can be implemented by utilizing the switch 960 of FIG. 9C, which includes at least one network interface 962, a memory 964, and a processing system 966, all connected via bus 968. The switches 1-n can be operable to store executable instructions in memory 964 that, when executed by the processing system 966, cause the switch 960 to send and receive, via one or more ports of the at least one network interface 962, network traffic via wired and/or wireless connections to other switches and/or other components of network 24. Some or all of the network switches 1-*n* can also be operable to monitor and send utilization data to the DST processing unit, for example, based on network traffic and/or congestion experienced. Alternatively, network traffic and/or congestion to some or all network switches 1-*n* can be monitored by other entities of the DSN for transmission to the DST processing unit 910.

In some embodiments, the DST processing unit generates current utilization data based on a plurality of received utilization levels from the IAM system and/or network elements, for example, where the utilization data is generated based on a sum, average, and/or aggregate analysis of the received utilization levels. The plurality of utilization levels can be received in response to a plurality of utilization level requests generated by the DST processing unit 910 and transmitted to the plurality of components of the DSN memory. The DST processing unit 910 can determine to request the plurality of utilization levels in predetermined time intervals, in response to receiving a request, in response to determining that system utilization has changed, in response to a request or other information received from the IAM system 930, and/or via a determination based on other factors. The DST processing unit 910 can determine a different plurality of components from which to request utilization levels in subsequent determinations of the utilization data at later times, for example, in response to determining that different components are participating in the authorization process. In various embodiments, one or more other elements of the DSN are responsible for collecting reported utilization and/or determining the utilization data, and the DST processing unit 910 can request the utilization data and/or otherwise receive the utilization data from the one or more other elements.

Once current system capacity is learned, the DSN memory can apply that understanding to perform dynamic batching on the authorization requests. The batching method can favor optimizing requester perceived latency (at the expense of requestor perceived latency) during periods of system congestion. Alternatively or in addition, the batching method can become more aggressive in terms of how many requests are batched together, depending on the severity of system congestion.

In an example of operation, a requestor 920 can send an operation request to the DST processing unit 910 that requires authorization. For example, the operation request can include read request, a write request, an access request, or another type of request involving data objects dispersed storage error encoded and stored in the plurality of storage units 1-*n*. The DST processing unit 910 can send an authorization request to the IAM system 930 automatically upon receiving the operation request, in response to determining that the system is within normal utilization conditions. For example, the DST processing unit 910 can compare a system utilization level of the current utilization data to a configured, normal utilization threshold, and can determine the system utilization level indicates normal system utilization when the system utilization level compares favorably to the normal utilization threshold. The IAM system 930 can determine whether the operation request by the requestor is authorized based on the received authorization request, and can send an authorization success or an authorization failure in response. If an authorization success is received from the IAM system 930, the DST processing unit 910 can execute the operation request accordingly. If an authorization failure is received, the DST processing unit can abstain from executing the request and/or can generate an authorization failure notification for transmission to the requestor and/or to entities deemed responsible for data indicated in the operation request Over time, the DST processing unit 910 can determine that the system is over-utilized based on subsequent utilization data, for example, generated based on a plurality of subsequent utilization levels of the plurality of DSN components. For example, the DST processing unit can determine that the utilization data compares unfavorably to the normal utilization threshold to determine that the system is over-utilized. In response to determining the system is over-utilized, as new operation requests send from one or more requestors 920 to the DST processing unit, the corresponding authorization requests are queued rather than transmitted to the IAM system 930 directly. For example, authorization requests can be stored in in queue 915 of a cache and/or local memory such as memory 54 of the computing core of the DST processing unit 910.

The DST processing unit 910 can later determine to send some or all of the authorization requests in the queue as a batched request. The DST processing unit can generate a single batched request to include authorization request information corresponding to the requests in the queue in response, and can sent the single batched request to the IAM system 930. The DST processing unit 910 can make this determination to send the queued requests based on determining the request queue compares unfavorably to a queue limit condition. For example, the DST processing unit 910 can send the queued authorization requests as a batched request in response to determining the number of authorization requests in the queue meets or exceeds a queue size threshold. Alternatively or in addition, the DST processing unit 910 can determine to send the authorization requests in the queue as a batched request in response to determining that a time since receiving the first request in the queue meets or exceeds a queuing time limit. In various embodiments, the DST processing unit 910 determines to send the authorization requests in the queue as a batched request in response to either of these conditions occurring, and/or in response to one of a plurality of queuing limit conditions that is triggered first. As discussed herein, this queue limit condition that automatically triggers the batching and transmission of the request queue can be determined by the DST processing unit 910 based on the current system utilization data.

The IAM system 930 can extract the authorization request information for each of the corresponding plurality of requests in the batch request to determine authorization success or failure for each of the plurality of requests of the batch request. The IAM system 930 can generate a batched response that indicates success or failure of each of the plurality of authorization requests of the batched requests. For example, as authorization responses indicating success or failure are determined for each request, the authorization responses can be queued by the IAM system 930. The IAM system 930 can send the authorization responses in its queue as a single, batched response back to the DST processing unit 910 once the authorization responses for each of the requests of the batched request are generated. Alternatively, the IAM system 930 can send the authorization responses one at a time, as they are generated, back to the DST processing unit 910.

In some embodiments, the IAM system 930 can generate batched responses based on its own queue limit conditions, such as its own size threshold and/or queuing time limit. For example, the IAM system 930 can determine to send a batched response to the DST processing unit 910 that indicates responses for only a portion of the requests in the batch request. Conversely, the IAM system 930 can determine to keep the responses in the queue after all of the requests have been processed and wait for further batched requests from the DST processing unit 910 to be received and processed to be included in the queue, and can send the queue of responses corresponding to multiple batched requests as a single batched response.

The DST processing unit 910 can determine that the system has returned to a normal utilization level, for example, by comparing the utilization data to the normal utilization threshold, and can determine to again send authorization requests to the IAM system upon receiving the corresponding operation request from requestors, without batching.

The effectiveness of the batching can be measured by the DST processing unit, or one or more other entities in the DSN, by observing the system capacity and other statistics as reported by components of the DSN over time. For example, the DST processing unit 910 can monitor the authorization request rate between the DST processing unit 910 and the IAM system 930. Alternatively or in addition, the DST processing unit 910 can monitor failed authorization requests that occur because of congestion or congestion related rate limiting. Alternatively or in addition, the DST processing unit 910 can monitor perceived latency of some or all requestors. Under conditions of normal utilization, requestor perceived latency should be low and authorization request rate should be high. When the system undergoes higher utilization levels, the requestor perceived latency should increase and the authorization request rate should decrease. This self-tuning can assist in moving the system back to normal utilization, normal user perceived latency, and/or maintaining low authorization failure rate.

To perform this self-tuning, the queue limit conditions such as the queue size threshold and/or the queuing time limit of the DST processing unit 910, and/or the IAM system 930, can be set to different values based on changing system utilization, and thus can be a function of the utilization data as updated utilization data is received. For example, in response to determining the system utilization has reduced from a great over-utilization to becoming only slightly over-utilized, the DST processing unit 910 can begin to send smaller batch requests and/or send batch requests more frequently. Conversely, in response to determining the system utilization has increased from a slight over-utilization to becoming greatly over-utilized, the DST processing unit 910 can being to send larger batch requests and/or send batch requests less frequently. In response to determining the system is at a normal utilization level, the DST processing unit can send authorization requests immediately without batching. The IAM system 930 can determine to send larger and smaller batch responses, and/or send batch responses more or less frequently based on changing system utilization, in a similar fashion. As system utilization changes over time, for example, as new utilization levels of DSN components is collected to generate updated utilization data, the queue size threshold and/or the queuing time limit can be updated by the DST processing unit 910 and/or the IAM system 930 accordingly in response.

In some embodiments, the queue limit conditions such as the queue size threshold and/or the queuing time limit can also be a function of the measured effectiveness of the system, perceived latency requirements of some or all of the requestors, and/or the number or proportion of failed authorization requests that occur, for example, because of congestion or congestion related rate limiting. For example, if a proportion of failed authorization requests exceeds a threshold, the DST processing unit 910 can determine to increase the queue size threshold and/or the queue time limit. As another example, if requestor perceived latency of some or all requestors exceeds a latency time limit, the DST processing unit can determine to decrease the queue size threshold and/or the queue time limit. The queue limit conditions can be a function of some or all of these factors, and these factors can be assigned weights, which can change over time as part of this self-tuning. In some embodiments, determining the queue limit conditions can include performing an optimization function to optimize the trade-off between requestor perceived latency, network utilization, IAM congestion, and/or proportion of failed authorization requests accordingly, by utilizing these assigned weights.

In some embodiments, the system utilization level of the utilization data can be determined, for example, by comparing the collection of reported utilization to a plurality of system utilization level thresholds. For example, utilization of the system can be determined to fall within one of N system utilization levels of increasing utilization by comparing the utilization data to the N system utilization levels. The queue size threshold and/or the queuing time limit can be an increasing function of N and/or can otherwise be an increasing function of system utilization level. A lowest level can correspond to a normal utilization level, where the queue size threshold is set to one and/or where the queuing time limit indicates to send the authorization request at the time the operation request is received.

Alternatively or in addition, the utilization level can indicate an over-utilization value of the system, which can be determined by calculating a utilization differential of the utilization data from the normal utilization threshold. For example, the normal utilization threshold can be subtracted from an aggregate utilization value of the utilization data to compute the utilization differential, where the aggregate utilization value is calculated based on the plurality of received utilization levels. The queue size threshold and/or the queuing time limit can be an increasing function of the utilization differential when the utilization data compares unfavorably to the normal utilization threshold. When the utilization data compares favorably to the normal utilization threshold, indicating normal utilization levels, the queue size threshold can be set to one and/or the queuing time limit can indicate to send the authorization request at the time the operation request is received. The over-utilization can be computed by the DST processing unit 910 as a weighted sum, weighted average, and/or other weighted function of the plurality of utilization levels, where the corresponding weight of each of the received utilization levels is based on how much the corresponding DSN component is determined affect system latency.

Figure 9D:
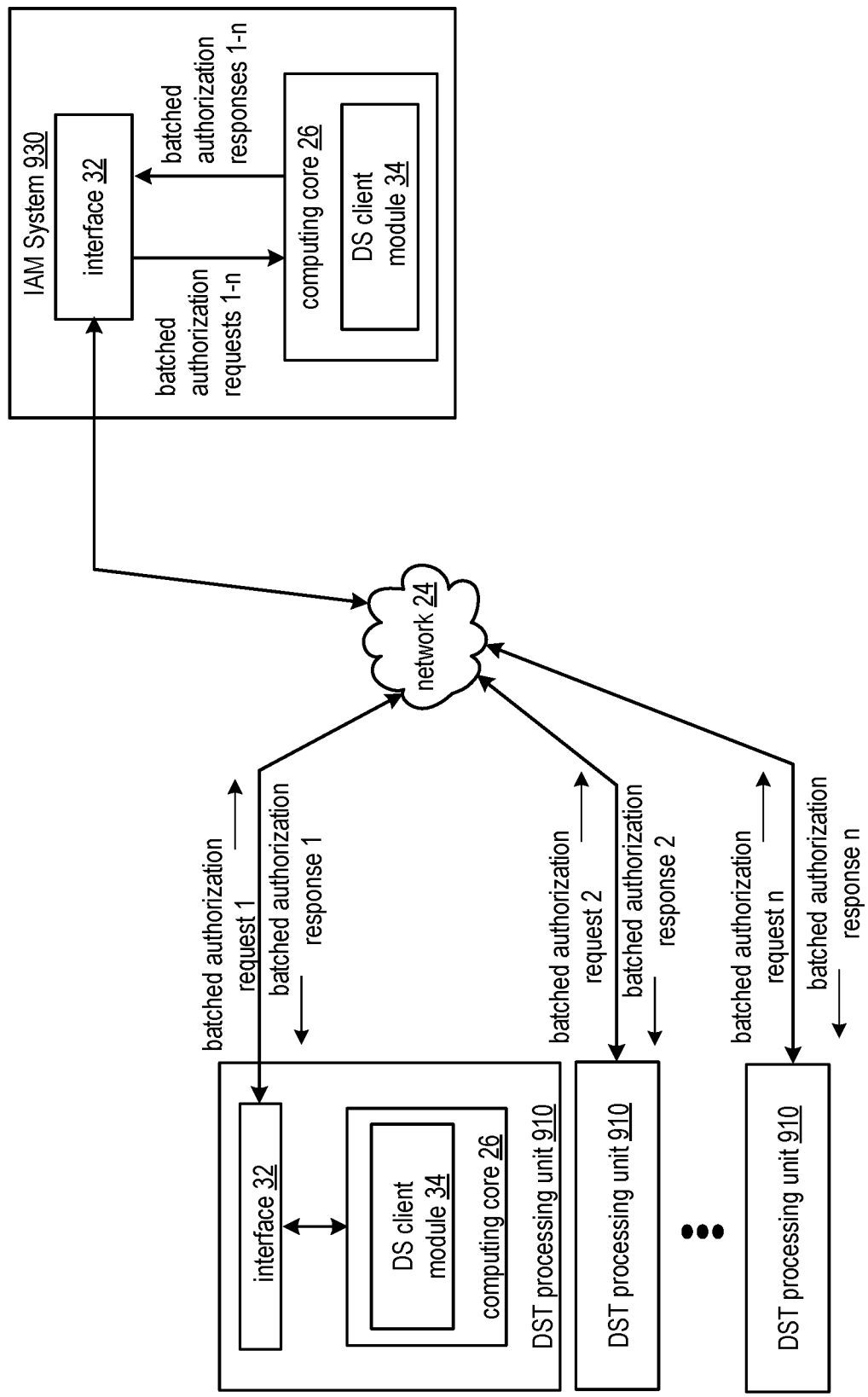
FIG. 9D is a schematic block diagram of an embodiment of a dispersed or distributed storage network (DSN) in accordance with the present invention.

The utilization data and/or corresponding queue limit conditions determined by the IAM system 930 can be different from the DST processing unit 910 as a result of congestion factors of the IAM system, for example, that are either unknown to the DST processing unit or irrelevant to the DST processing unit. For example, as shown in FIG. 9D, some embodiments can include multiple DST processing units 910 that send authorization requests to the IAM system 930. In such embodiments, the IAM system can determine its utilization data based on traffic received from multiple DST processing units 910 in the system, all sending their own batched or unbatched authorization requests. A single DST processing unit 910 may not consider this traffic caused by other DST processing units 910 in determining its queue limit conditions, and/or may consider different factors such different congestion and/or utilization data, requestor priorities and/or different perceived requestor latency requirements, or other factors that are either unknown to the IAM system 930 or irrelevant to the IAM system 930, thus leading to differing queue size thresholds and/or differing queuing time limits. Alternatively, the IAM system 930 can send capacity information, network traffic data, and/or congestion information based on traffic from the multiple DST processing units 910 to some or all of the DST processing units 910. Some or all of the DST processing unit 910 can determine to use this information when determining their utilization data. In such embodiments, this strategy can be used to synchronize queue size threshold and/or the queuing time limit between the IAM system and some or all DST processing units 910, for example, in response to system-wide utilization changes. Alternatively, the IAM system 930 can generate its batched responses to match the number of batched requests of the corresponding DST processing unit by default, and thus will not determine its own queue limit conditions.

In some embodiments, the DST processing unit 910 can determine to send the authorization requests in the queue as a batched request in response to determining that one or more requests in the queue corresponds to an urgent or otherwise high priority operation type and/or corresponds to a high priority requestor. In some embodiments, high priority operations can supersede the queue limit conditions, where some or all requests in the request queue are batched and transmitted before the queue limit conditions are reached. For example, the DST processing unit 910 can determine whether or not a received request is high priority upon receiving the request. In response to determining that the request is high priority, the DST processing unit 910 can determine to batch an authorization request corresponding to the high priority operation along with the authorization requests already in the queue for transmission to the IAM system, or can determine to send the single authorization request corresponding to the high priority operation when there are no other authorization requests in the queue. As another example, some or all requests in the queue can have a corresponding operation deadline and/or authorization deadline, determined by the DST processing unit and/or included in the request. The DST processing unit, in response to determining that any request in the authorization queue is approaching its operation deadline and/or authorization deadline, and/or in response to otherwise determining that the current time compares unfavorably to the operation deadline and/or authorization deadline, can proceed to generate the batched authorization request with all the requests in the queue and send the batched authorization request to the IAM system.

Such a prioritization of the requestors 920 can be utilized in embodiments where requestor perceived latency is a factor utilized in determining the queue limit conditions. The queue limit conditions can be a function of the requestor perceived latency of the plurality of requestors 920, which can be weighted by a priority assigned to the requestor 920 and/or a priority assigned to an operation request sent by the requestor 920. For example, a higher weight assigned to a higher priority requestor 920 result in a greater reduction in the queue size threshold and/or the queue time limit, and thus result in a greater reduction of the perceived latency of the high priority requestor (perhaps at the expense of the system utilization and/or congestion to the IAM system 930). Meanwhile, a lower priority requestor may not be favored in the same way, with a much smaller improvement, or no improvement, in perceived latency.

In various embodiments, a processing system of a dispersed storage and task (DST) processing unit includes at least one processor and a memory that stores operational instructions, that when executed by the at least one processor cause the processing system to determine first system utilization data. A first operation request is received, and a first request queue that includes a first authorization request corresponding to the first operation request is generated in response to determining that the first system utilization data indicates a first utilization level that compares unfavorably to a normal utilization threshold. A first queue limit condition is determined in response to generating the first request queue, based on the first system utilization data. A first subsequent operation request corresponding the first subsequent operation request is received and appended to the first request queue. A first batched authorization request that includes a first plurality of authorization requests of the first request queue is generated in response to determining that the first request queue compares unfavorably to the first queue limit condition. The first batched authorization request to an IAM system, and a first plurality of authorization responses are received from the IAM system, corresponding to the first plurality of authorization requests of the first request queue. A first subset of the first plurality of authorization responses that indicate authorization success are identified, and execution of a subset of a plurality of operation requests corresponding to the first subset of the first plurality of authorization responses is facilitated.

Second system utilization data is determined, and a second operation request is received. A second request queue that includes a second authorization request corresponding to the second operation request is generated in response to determining that the second system utilization data indicates a second utilization level that compares unfavorably to the normal utilization threshold, where the second utilization level is different from the first utilization level. A second queue limit condition is determined in response to generating the second request queue, based on the second system utilization data, where the second queue limit condition is different from the first queue limit condition. A second subsequent operation request corresponding to the second subsequent operation request is received and appended to the second request queue.

In various embodiments, a second batched authorization request that includes a second plurality of authorization requests of the second request queue is generated in response to determining that the second request queue compares unfavorably to the second queue limit condition, and the second batched authorization request is sent to the IAM system.

In various embodiments, third system utilization data is determined. A third queue limit condition is determined, based on the third system utilization data, where the third queue limit condition is different from the second queue limit condition. A second batched authorization request that includes a second plurality of authorization requests of the second request queue is generated in response determining the third queue limit condition, and in response to determining that the second request queue compares unfavorably third queue limit condition to the third queue limit condition, where the second request queue compares favorably to the second queue limit condition. The second batched authorization request is sent to the IAM system.

Figure 10A:
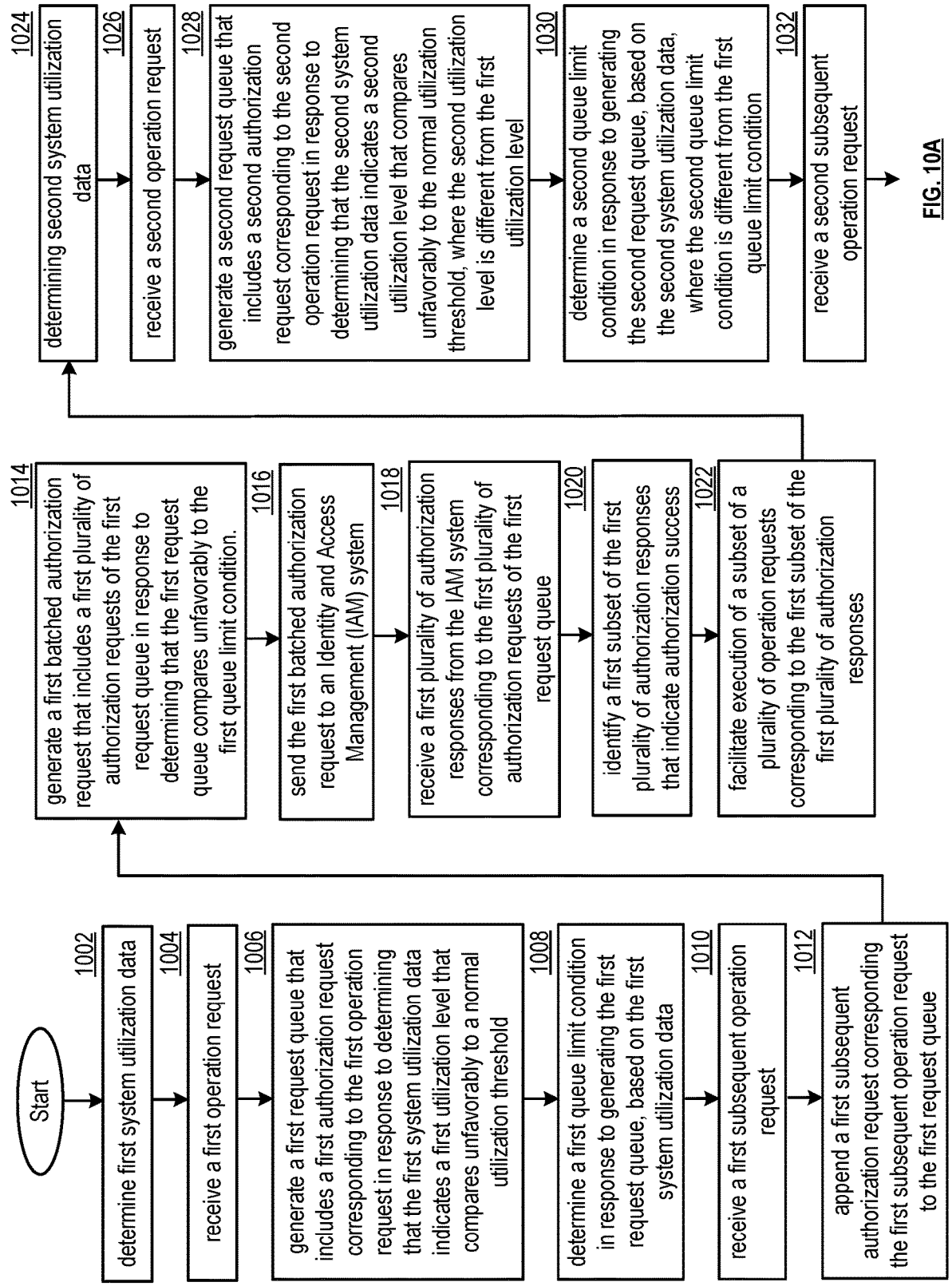
FIG. 10A is a logic diagram of an example of a method of dynamic authorization batching in accordance with the present invention.

FIGS. 10A-10C are flowcharts illustrating examples of dynamic authorization batching. In particular, FIG. 10A presents a method for use in association with one or more functions and features described in conjunction with FIGS. 1-9D, for execution by a dispersed storage and task (DST) processing unit that includes a processor or via another processing system of a dispersed storage network that includes at least one processor and memory that stores instruction that configure the processor or processors to perform the steps described below.

Step 1002 includes determining first system utilization data. Step 1004 includes receiving a first operation request. Step 1006 includes generating a first request queue that includes a first authorization request corresponding to the first operation request in response to determining that the first system utilization data indicates a first utilization level that compares unfavorably to a normal utilization threshold. Step 1008 includes determining a first queue limit condition in response to generating the first request queue, based on the first system utilization data.

Step 1010 includes receiving a first subsequent operation request. Step 1012 includes appending a first subsequent authorization request corresponding the first subsequent operation request to the first request queue. Step 1014 includes generating a first batched authorization request that includes a first plurality of authorization requests of the first request queue in response to determining that the first request queue compares unfavorably to the first queue limit condition. Step 1016 includes sending the first batched authorization request to an Identity and Access Management (IAM) system. Step 1018 includes receiving a first plurality of authorization responses from the IAM system corresponding to the first plurality of authorization requests of the first request queue. Step 1020 includes identifying a first subset of the first plurality of authorization responses that indicate authorization success. Step 1022 includes facilitating execution of a subset of a plurality of operation requests corresponding to the first subset of the first plurality of authorization responses.

Step 1024 includes determining second system utilization data. Step 1026 includes receiving a second operation request. Step 1028 includes generating a second request queue that includes a second authorization request corresponding to the second operation request in response to determining that the second system utilization data indicates a second utilization level that compares unfavorably to the normal utilization threshold, where the second utilization level is different from the first utilization level. Step 1030 includes determining a second queue limit condition in response to generating the second request queue, based on the second system utilization data, where the second queue limit condition is different from the first queue limit condition. Step 1032 includes receiving a second subsequent operation request.

After step 1032 of FIG. 10A, the method can continue to step 1034 as shown in FIG. 10B. Step 1034 includes appending the second subsequent authorization request corresponding to the second subsequent operation request to the second request queue. Step 1036 includes generating a second batched authorization request that includes a second plurality of authorization requests of the second request queue in response to determining that the second request queue compares unfavorably to the second queue limit condition. Step 1038 includes sending the second batched authorization request to the IAM system.

As shown in FIG. 10C, in various embodiments, the method of FIG. 10A can continue from step 1032 of FIG. 10A to step 1034, which again includes appending the second subsequent authorization request corresponding to the second subsequent operation request to the second request queue. From step 1034, the method can continue at step 1040, which includes determining third system utilization data. Step 1042 includes determining a third queue limit condition, based on the third system utilization data, where the third queue limit condition is different from the second queue limit condition. Step 1044 includes generating a second batched authorization request that includes a second plurality of authorization requests of the second request queue in response determining the third queue limit condition, and in response to determining that the second request queue compares unfavorably third queue limit condition to the third queue limit condition, where the second request queue compares favorably to the second queue limit condition. Step 1046 includes sending the second batched authorization request to the IAM system.

In various embodiments, third system utilization data is determined and a receiving a third operation request is received. It is determined to send a third authorization request corresponding to the third operation request to the IAM system as a single authorization request in response to determining that the third system utilization data indicates a system utilization level that compares favorably to a normal utilization threshold. A single authorization response is received from the IAM system corresponding to the third authorization request. Execution of the third operation request is facilitated when the single authorization response indicates authorization success.

In various embodiments, a second subset of the first plurality of authorization responses that indicate authorization failure is identified, where an intersection of the second subset of the first plurality of authorization responses and the first subset of the first plurality of authorization responses is null. A subset of a plurality of requestors that sent a second subset of the plurality of operation requests corresponding to the second subset of the first plurality of authorization responses is identified. An authorization failure notification is generated for transmission to the subset of the plurality of requestors.

In various embodiments, the first plurality of authorization responses is received in a first batched authorization response generated by the IAM system. In various embodiments, at least one first response of the first plurality of authorization responses is received in a first transmission at a first time, at least one second response of the first plurality of authorization responses is received in a second transmission at a second time, and the first time is different from the second time.

In various embodiments, the first operation request includes a read request that indicates a data object, where a dispersed storage error encoding function was performed on a data segment of the data object to produce a set of encoded data slices stored in a set of storage units of the DSN. An authorization response that corresponds to the first operation request indicates authorization success, and executing the first operation request includes retrieving a read threshold number of the set of encoded data slices from the set of storage units, as well as performing a dispersed storage error decoding function on the read threshold number of the set of encoded data slices to reproduce the data segment.

In various embodiments, a first plurality of network utilization levels is received from a set of network components of the DSN, and the first system utilization data is generated based on the first plurality of network utilization levels. A second plurality of network utilization levels are received from the set of network components of the DSN, and the second system utilization data is generated based on the second plurality of network utilization levels. In various embodiments, the set of network components of the DSN is a subset of a plurality of network components of the DSN. The set of network components is determined based on identifying ones of the plurality of network components of the DSN that participate in authorization of operation requests. A first plurality of network utilization level requests is generated for transmission to the set of network components of the DSN, and the first plurality of network utilization levels are received in response to the first plurality of network utilization level requests. In various embodiments, the set of network components includes a plurality of network switches determined to route authorization requests from the DST processing unit to the IAM system.

In various embodiments, a first IAM utilization level is received from the IAM system, and the first system utilization data is generated based on the first IAM utilization level. A second IAM utilization level is received from the IAM system, and the second system utilization data is generated based on the second IAM utilization level. The first IAM utilization level and the second IAM utilization level are generated by the IAM based on network traffic to the IAM system.

In various embodiments, the first queue limit condition indicates a first queue size threshold, and the second queue limit condition indicates a second queue size threshold. The first queue size threshold is larger than the second queue size threshold based on the first utilization level indicating more severe over-utilization than the second utilization level. In response, a first number of the first plurality of authorization requests of the first batched authorization request is greater than a second number of the second plurality of authorization requests of the second batched authorization request. In various embodiments, determining the first queue limit condition includes calculating the first queue size threshold by performing a function on the first utilization level, and determining the second queue limit condition includes calculating the second queue size threshold by performing the function on the second utilization level. The function calculates queue size threshold as a monotonically increasing function of utilization level.

In various embodiments, the first queue limit condition indicates a first queue time limit, and the second queue limit condition indicates a second queue time limit. The first queue time limit is shorter than the second queue time limit based on the second utilization level indicating less severe over-utilization than the first utilization level. In response, a first time elapsed from generation of the first request queue to generation of the first batched authorization request is shorter than a second time elapsed from the generation of the second request queue to the generation of the second batched authorization request. In various embodiments, determining the first queue limit condition includes calculating the first queue time limit by performing a function on the first utilization level, and determining the second queue limit condition includes calculating the second queue time limit by performing the function on the second utilization level. The function calculates queue time limit as a monotonically increasing function of utilization level. In various embodiments, the first queue limit condition includes a first queue time limit, the second queue limit condition includes a second queue time limit, and the second queue time limit is determined to be shorter than the first queue time limit in response to determining that the first queue time limit compares unfavorably to a requestor perceived latency requirement.

In various embodiments, determining the second queue limit condition is further based on determining that a proportion of failed authorization responses of the first plurality of authorization responses compares unfavorably to a failed response threshold.

In various embodiments, a non-transitory computer readable storage medium includes at least one memory section that stores operational instructions that, when executed by a processing system of a dispersed storage network (DSN) that includes a processor and a memory, causes the processing system to determine first system utilization data. A first operation request is received, and a first request queue that includes a first authorization request corresponding to the first operation request is generated in response to determining that the first system utilization data indicates a first utilization level that compares unfavorably to a normal utilization threshold. A first queue limit condition is determined in response to generating the first request queue, based on the first system utilization data. A first subsequent operation request corresponding the first subsequent operation request is received and appended to the first request queue. A first batched authorization request that includes a first plurality of authorization requests of the first request queue is generated in response to determining that the first request queue compares unfavorably to the first queue limit condition. The first batched authorization request to an IAM system, and a first plurality of authorization responses are received from the IAM system, corresponding to the first plurality of authorization requests of the first request queue. A first subset of the first plurality of authorization responses that indicate authorization success are identified, and execution of a subset of a plurality of operation requests corresponding to the first subset of the first plurality of authorization responses is facilitated.

Second system utilization data is determined, and a second operation request is received. A second request queue that includes a second authorization request corresponding to the second operation request is generated in response to determining that the second system utilization data indicates a second utilization level that compares unfavorably to the normal utilization threshold, where the second utilization level is different from the first utilization level. A second queue limit condition is determined in response to generating the second request queue, based on the second system utilization data, where the second queue limit condition is different from the first queue limit condition. A second subsequent operation request corresponding to the second subsequent operation request is received and appended to the second request queue.

In various embodiments, a second batched authorization request that includes a second plurality of authorization requests of the second request queue is generated in response to determining that the second request queue compares unfavorably to the second queue limit condition, and the second batched authorization request is sent to the IAM system.

In various embodiments, third system utilization data is determined. A third queue limit condition is determined, based on the third system utilization data, where the third queue limit condition is different from the second queue limit condition. A second batched authorization request that includes a second plurality of authorization requests of the second request queue is generated in response determining the third queue limit condition, and in response to determining that the second request queue compares unfavorably third queue limit condition to the third queue limit condition, where the second request queue compares favorably to the second queue limit condition. The second batched authorization request is sent to the IAM system.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage and task (DST) processing unit of a dispersed storage network (DSN) that includes a processor, the method comprises:
    determining first system utilization data;
    receiving a first operation request;
    generating a first request queue having a first queue limit, the first request queue including a first authorization request corresponding to the first operation request in response to determining that the first system utilization data indicates a first utilization level that compares unfavorably to a normal utilization threshold;
    receiving a first subsequent operation request;
    appending a first subsequent authorization request corresponding the first subsequent operation request to the first request queue;
    generating a first batched authorization request that includes a first plurality of authorization requests of the first request queue in response to determining that the first request queue compares unfavorably to the first queue limit condition;
    sending the first batched authorization request to an Identity and Access Management (IAM) system;
    receiving a first plurality of authorization responses from the IAM system corresponding to the first plurality of authorization requests of the first request queue;
    identifying a first subset of the first plurality of authorization responses that indicate authorization success;
    facilitating execution of a subset of a plurality of operation requests corresponding to the first subset of the first plurality of authorization responses;
    determining second system utilization data;
    receiving a second operation request;
    generating a second request queue that includes a second authorization request corresponding to the second operation request in response to determining that the second system utilization data indicates a second utilization level that compares unfavorably to the normal utilization threshold, wherein the second utilization level is different from the first utilization level;
    determining a second queue limit condition in response to generating the second request queue, based on the second system utilization data, wherein the second queue limit condition is different from the first queue limit condition;
    receiving a second subsequent operation request;
    appending a second subsequent authorization request corresponding to the second subsequent operation request to the second request queue;
    generating a second batched authorization request that includes a second plurality of authorization requests of the second request queue in response to determining that the second request queue compares unfavorably to the second queue limit condition; and
    sending the second batched authorization request to the IAM system.

2. The method of claim 1, further comprising:
    determining third system utilization data;
    receiving a third operation request;
    determining to send a third authorization request corresponding to the third operation request to the IAM system as a single authorization request in response to determining that the third system utilization data indicates a system utilization level that compares favorably to a normal utilization threshold;
    receiving a single authorization response from the IAM system corresponding to the third authorization request; and
    facilitating execution of the third operation request when the single authorization response indicates authorization success.

3. The method of claim 1, further comprising:
    identifying a second subset of the first plurality of authorization responses that indicate authorization failure, wherein an intersection of the second subset of the first plurality of authorization responses and the first subset of the first plurality of authorization responses is null;

identifying a subset of a plurality of requestors that sent a second subset of the plurality of operation requests corresponding to the second subset of the first plurality of authorization responses; and generating an authorization failure notification for transmission to the subset of the plurality of requestors.

4. The method of claim 1, wherein the first plurality of authorization responses is received in a first batched authorization response generated by the IAM system.

5. The method of claim 1, wherein at least one first response of the first plurality of authorization responses is received in a first transmission at a first time, wherein at least one second response of the first plurality of authorization responses is received in a second transmission at a second time, and wherein the first time is different from the second time.

6. The method of claim 1, wherein the first operation request includes a read request that indicates a data object, wherein a dispersed storage error encoding function was performed on a data segment of the data object to produce a set of encoded data slices stored in a set of storage units of the DSN, wherein an authorization response that corresponds to the first operation request indicates authorization success, and wherein executing the first operation request includes:

retrieving a read threshold number of the set of encoded data slices from the set of storage units; and performing a dispersed storage error decoding function on the read threshold number of the set of encoded data slices to reproduce the data segment.

7. The method of claim 1, further comprising:

receiving a first plurality of network utilization levels from a set of network components of the DSN;

generating the first system utilization data based on the first plurality of network utilization levels;

receiving a second plurality of network utilization levels from the set of network components of the DSN; and generating the second system utilization data based on the second plurality of network utilization levels.

8. The method of claim 7, wherein the set of network components of the DSN is a subset of a plurality of network components of the DSN, further comprising:

determining the set of network components based on identifying ones of the plurality of network components of the DSN that participate in authorization of operation requests; and generating a first plurality of network utilization level requests for transmission to the set of network components of the DSN, wherein the first plurality of network utilization levels is received in response to the first plurality of network utilization level requests.

9. The method of claim 8, wherein the set of network components includes a plurality of network switches determined to route authorization requests from the DST processing unit to the IAM system.

10. The method of claim 1, further comprising:

receiving a first TAM utilization level from the TAM system;

generating the first system utilization data based on the first IAM utilization level;

receiving a second IAM utilization level from the IAM system; and generating the second system utilization data based on the second IAM utilization level;

wherein the first IAM utilization level and the second IAM utilization level are generated by the IAM based on network traffic to the IAM system.

11. The method of claim 1, wherein the first queue limit condition indicates a first queue size threshold, wherein the second queue limit condition indicates a second queue size threshold, wherein the first queue size threshold is larger than the second queue size threshold based on the first utilization level indicating more severe over-utilization than the second utilization level, and wherein, in response, a first number of the first plurality of authorization requests of the first batched authorization request is greater than a second number of the second plurality of authorization requests of the second batched authorization request.

12. The method of claim 11, wherein determining the first queue limit condition includes calculating the first queue size threshold by performing a function on the first utilization level, wherein determining the second queue limit condition includes calculating the second queue size threshold by performing the function on the second utilization level, and wherein the function calculates queue size threshold as a monotonically increasing function of utilization level.

13. The method of claim 1, wherein the first queue limit condition indicates a first queue time limit, wherein the second queue limit condition indicates a second queue time limit, wherein the first queue time limit is shorter than the second queue time limit based on the second utilization level indicating less severe over-utilization than the first utilization level, and wherein, in response, a first time elapsed from generation of the first request queue to generation of the first batched authorization request is shorter than a second time elapsed from the generation of the second request queue to the generation of the second batched authorization request.

14. The method of claim 13, wherein determining the first queue limit condition includes calculating the first queue time limit by performing a function on the first utilization level, wherein determining the second queue limit condition includes calculating the second queue time limit by performing the function on the second utilization level, and wherein the function calculates queue time limit as a monotonically increasing function of utilization level.

15. The method of claim 13, wherein the first queue limit condition includes a first queue time limit, wherein the second queue limit condition includes a second queue time limit, and wherein the second queue time limit is determined to be shorter than the first queue time limit in response to determining that the first queue time limit compares unfavorably to a requestor perceived latency requirement.

16. The method of claim 1, wherein determining the second queue limit condition is further based on determining that a proportion of failed authorization responses of the first plurality of authorization responses compares unfavorably to a failed response threshold.

17. A processing system of a dispersed storage and task (DST) processing unit comprises:

at least one processor;

a memory that stores operational instructions, that when executed by the at least one processor cause the processing system to:

determine first system utilization data;

receive a first operation request;

generate a first request queue having a first queue limit, the first request queue including a first authorization request corresponding to the first operation request in response to determining that the first system utilization data indicates a first utilization level that compares unfavorably to a normal utilization threshold;

receive a first subsequent operation request;

append a first subsequent authorization request corresponding the first subsequent operation request to the first request queue;
generate a first batched authorization request that includes a first plurality of authorization requests of the first request queue in response to determining that the first request queue compares unfavorably to the first queue limit condition;
send the first batched authorization request to an Identity and Access Management (IAM) system;
receive a first plurality of authorization responses from the IAM system corresponding to the first plurality of authorization requests of the first request queue;
identify a first subset of the first plurality of authorization responses that indicate authorization success;
facilitate execution of a subset of a plurality of operation requests corresponding to the first subset of the first plurality of authorization responses;
determine second system utilization data;
receive a second operation request;
generate a second request queue that includes a second authorization request corresponding to the second operation request in response to determining that the second system utilization data indicates a second utilization level that compares unfavorably to the normal utilization threshold, wherein the second utilization level is different from the first utilization level;
determine a second queue limit condition in response to generating the second request queue, based on the second system utilization data, wherein the second queue limit condition is different from the first queue limit condition;
receive a second subsequent operation request;
append a second subsequent authorization request corresponding to the second subsequent operation request to the second request queue;
generate a second batched authorization request that includes a second plurality of authorization requests of the second request queue in response to determining that the second request queue compares unfavorably to the second queue limit condition; and
send the second batched authorization request to the IAM system.

18. The processing system of claim 17, wherein the operational instructions, when executed by the at least one processor, further cause the processing system to:
determine third system utilization data;
receive a third operation request;
determine to send a third authorization request corresponding to the third operation request to the IAM system as a single authorization request in response to determining that the third system utilization data indicates a system utilization level that compares favorably to a normal utilization threshold;
receive a single authorization response from the IAM system corresponding to the third authorization request; and
facilitate execution of the third operation request when the single authorization response indicates authorization success.

19. The processing system of claim 17, wherein the operational instructions, when executed by the at least one processor, further cause the processing system to:
receive a first plurality of network utilization levels from a set of network components;
generate the first system utilization data based on the first plurality of network utilization levels;
receive a second plurality of network utilization levels from the set of network components; and
generate the second system utilization data based on the second plurality of network utilization levels.

20. A computer readable storage medium comprises:
at least one memory section that stores operational instructions that, when executed by a processing system of a dispersed storage network (DSN) that includes a processor and a memory, causes the processing system to:
determine first system utilization data;
receive a first operation request;
generate a first request queue having a first queue limit, the first request queue including a first authorization request corresponding to the first operation request in response to determining that the first system utilization data indicates a first utilization level that compares unfavorably to a normal utilization threshold;
receive a first subsequent operation request;
append a first subsequent authorization request corresponding the first subsequent operation request to the first request queue;
generate a first batched authorization request that includes a first plurality of authorization requests of the first request queue in response to determining that the first request queue compares unfavorably to the first queue limit condition;
send the first batched authorization request to an Identity and Access Management (IAM) system;
receive a first plurality of authorization responses from the IAM system corresponding to the first plurality of authorization requests of the first request queue;
identify a first subset of the first plurality of authorization responses that indicate authorization success;
facilitate execution of a subset of a plurality of operation requests corresponding to the first subset of the first plurality of authorization responses;
determine second system utilization data;
receive a second operation request;
generate a second request queue that includes a second authorization request corresponding to the second operation request in response to determining that the second system utilization data indicates a second utilization level that compares unfavorably to the normal utilization threshold, wherein the second utilization level is different from the first utilization level;
determine a second queue limit condition in response to generating the second request queue, based on the second system utilization data, wherein the second queue limit condition is different from the first queue limit condition;
receive a second subsequent operation request;
append a second subsequent authorization request corresponding to the second subsequent operation request to the second request queue;
generate a second batched authorization request that includes a second plurality of authorization requests of the second request queue in response to determining that the second request queue compares unfavorably to the second queue limit condition; and
send the second batched authorization request to the IAM system.

* * * * *